United States Patent [19]

Inoue

[11] Patent Number: 5,263,031
[45] Date of Patent: Nov. 16, 1993

[54] SEMICONDUCTOR INTEGRATED CIRCUIT HAVING POST-PACKAGE TESTING FUNCTION FOR ERROR DETECTION AND CORRECTION CIRCUIT

[75] Inventor: Makoto Inoue, Kanagawa, Japan

[73] Assignee: NEC Corporation, Tokyo, Japan

[21] Appl. No.: 868,830

[22] Filed: Apr. 15, 1992

[30] Foreign Application Priority Data

Apr. 15, 1991 [JP] Japan .................................. 3-82135

[51] Int. Cl.⁵ ...................... G06F 11/00; H03M 13/00
[52] U.S. Cl. .................................. 371/40.1; 371/40.2
[58] Field of Search ........................ 371/40.1–40.3, 371/41, 21.1, 22.1, 22, 3

[56] References Cited

U.S. PATENT DOCUMENTS 4,858,236  8/1989  Ogasawara ........................... 371/40.1
4,965,828  10/1990  Ergott, Jr. et al. ...................... 371/14

Primary Examiner—Hoa T. Nguyen
Attorney, Agent, or Firm—Whitham & Marhoeffer

[57] ABSTRACT

In a semiconductor integrated circuit including therein an electrically writable non-volatile semiconductor memory (10) and an error detection and correction circuit (3) for detecting and correcting an error of data read out from the semiconductor memory, there is provided an output selection register (6) set with a register setting signal (RS) so as to output a selection signal (R) having the level of the stored content of the output selection register itself. A selection signal switching circuit (7) receives the selection signal (R) from the output selection register (6) and another selection signal (S) from an output selection memory cell section (4) of the non-volatile semiconductor memory (10). The selection signal switching circuit (7) selects one of the received selection signals in accordance with a test signal (TS) and outputs the selected selection signal (DS) to a data selection circuit (5). With this arrangement, even after the semiconductor integrated circuit is assembled in a package or a system both of which do not allow to erase the content of the memory, it is possible to verify the operation of the error detection and correction circuit (3).

2 Claims, 1 Drawing Sheet

SEMICONDUCTOR INTEGRATED CIRCUIT HAVING POST-PACKAGE TESTING FUNCTION FOR ERROR DETECTION AND CORRECTION CIRCUIT

BACKGROUND OF THE INVENTION

1. Field of the Invention

The present invention relates to a semiconductor integrated circuit, and more specifically to a semiconductor integrated circuit including therein an electrically writable non-volatile semiconductor memory and an error detection and correction circuit for detecting and correcting an error of data read out from the semiconductor memory.

2. Description of Related Art

In this type of conventional semiconductor integrated circuit, data is read out from a data bit memory section of an electrically writable non-volatile semiconductor memory, and supplied to a data selection circuit and an error detection and correction circuit. Simultaneously, a check bit or bits are read out from a check bit memory section of the electrically writable non-volatile semiconductor memory, and also supplied to the error detection and correction circuit. On the basis of the data read out from the data bit memory section and the check bit or bits read out from the check bit memory section, the error detection and correction circuit generates a detection signal indicative of whether or not an error exists in the read-out data. In addition, the error detection and correction circuit outputs the read-out data without modification to the data selection circuit if no error exists in the read-out data, and also generates corrected data to the data selection circuit if the error exists in the read-out data.

Furthermore, on the basis of a selection signal read out from an output selection bit memory section of the electrically writable non-volatile semiconductor memory, the data selection circuit selects and outputs one of the data read out from the data bit memory section and the corrected data outputted from the error detection and correction circuit.

When the above mentioned conventional semiconductor integrated circuit is assembled in a package or a system both of which do not allow to erase the content of the memory, the content of the output selection bit memory section of the electrically writable non-volatile semiconductor memory can no longer be modified. In other words, it is impossible to voluntarily or freely set the selection signal. As a result, after the assembling, an operation verifying test of the error detection and correction circuit cannot be performed.

SUMMARY OF THE INVENTION

Accordingly, it is an object of the present invention to provide a semiconductor integrated circuit which has overcome the above mentioned defect of the conventional one.

Another object of the present invention is to provide a semiconductor integrated circuit including therein an electrically writable non-volatile semiconductor memory and an error detection and correction circuit and capable of performing the operation verifying test of the error detection and correction circuit even after the integrated circuit is assembled in a package or a system both of which do not allow to erase the content of the memory.

The above and other objects of the present invention are achieved in accordance with the present invention by a semiconductor integrated circuit comprising:

a data bit memory cell section composed of a number of electrically writable non-volatile semiconductor memory cells and for storing data bit information in units of a predetermined number of bits;

a check bit memory cell section composed of a number of electrically writable non-volatile semiconductor memory cells and for storing check bit information corresponding to each storing unit of data bit information stored in the data bit memory cell section;

an error detection and correction circuit receiving data bit information read out from the data bit memory cell section and the corresponding check bit information read out from the check bit memory cell section, the error detection and correction circuit detecting whether or not an error exists in the read-out data bit information, and generating corrected data bit information if an error exists and the detected error can be corrected, the error detection and correction circuit outputting the received read-out data bit information without modification in the case of no error;

an output selection memory cell section composed of at least one electrically writable non-volatile semiconductor memory cell and for outputting a first selection signal of a level corresponding to a content stored in the output selection memory cell section itself;

an output selection register, set in accordance with a register setting signal, for outputting a second selection signal of a level corresponding to a content registered in the output selection register itself;

a selection signal switching circuit receiving the first and second signals and and controlled by a test signal, so as to output a data selection signal formed of one of the first and second signals designated by the test signal; and a data selection circuit, receiving the data bit information read out from the data bit memory cell section and the output of the error detection and correction circuit, and controlled by the data selection signal so as to output, as output data, one of the data bit information read out from the data bit memory cell section and the output of the error detection and correction circuit, designated by the data selection signal.

In a preferred embodiment, the data bit memory cell section includes a test data region composed of at least a first test data bit area storing first correct data bit information of one unit, and a second test data bit area storing one unit of error data bit information formed by replacing a predetermined bit or bits of second correct data bit information by an error bit or bits, and wherein the check bit memory cell section includes a test check bit region composed of at least a first test check bit area storing a check bit information corresponding to the first correct data bit information stored in the first test data bit area, and a second test check bit area storing a check bit information corresponding to the second correct data bit information on the basis of which the error data bit information stored in the second test data bit area was produced.

The above and other objects, features and advantages of the present invention will be apparent from the following description of preferred embodiments of the invention with reference to the accompanying drawings.

DESCRIPTION OF THE PREFERRED EMBODIMENTS

Figure 1:
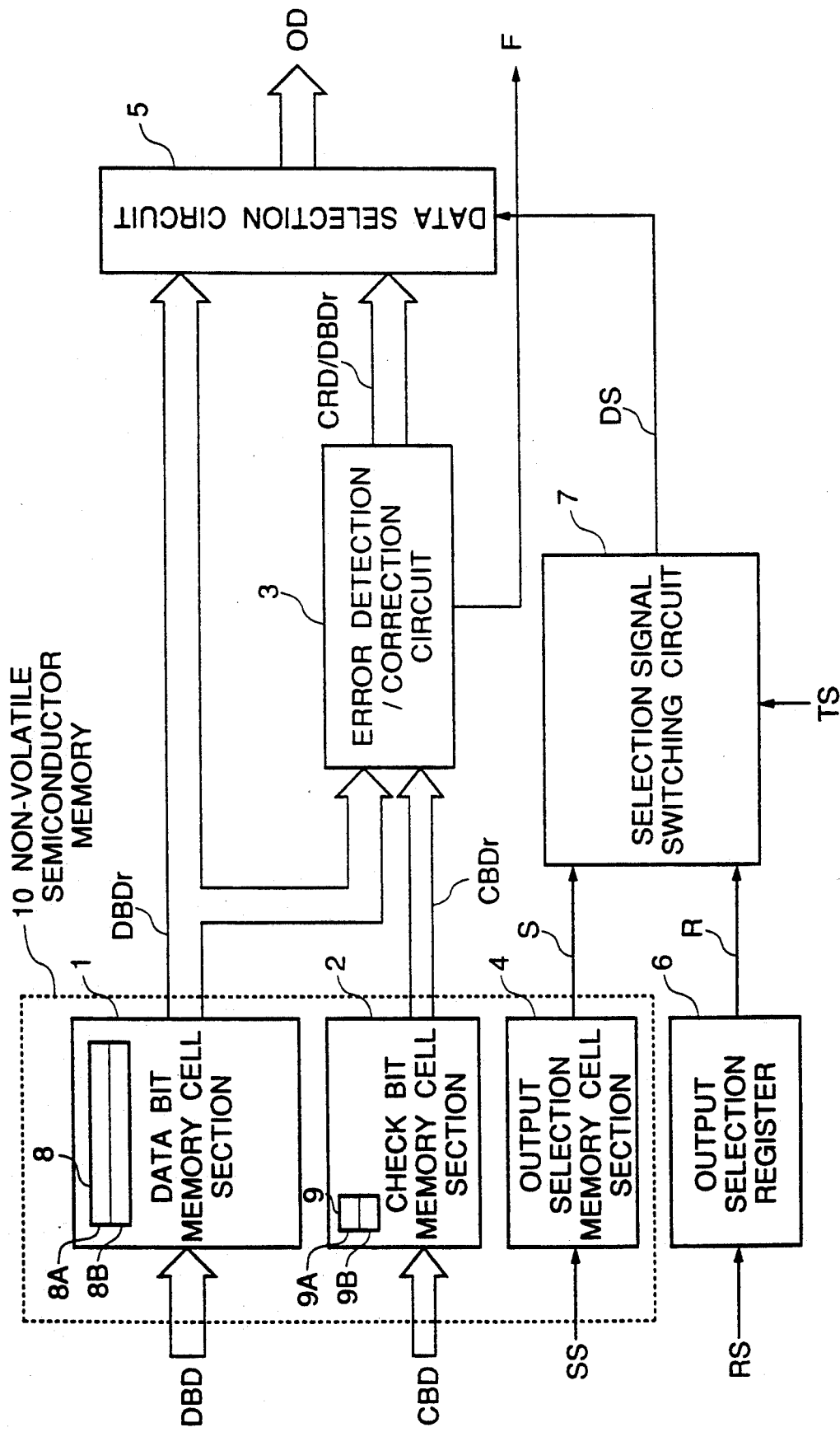
FIG. 1 is a block diagram of one embodiment of the semiconductor integrated circuit in accordance with the present invention.

Referring to FIG. 1, there is shown a block diagram of one embodiment of the semiconductor integrated circuit in accordance with the present invention.

The shown semiconductor integrated circuit comprises therein an electrically writable non-volatile semiconductor memory 10, which includes a data bit memory cell section 1 composed of a number of electrically writable non-volatile semiconductor memory cells and capable of storing data bit information DBD in units of a predetermined number of bits, for example, in units of one byte or one word, a check bit memory cell section 2 composed of a number of electrically writable non-volatile semiconductor memory cells and capable of storing check bit information CBD (composed of one or more bits) corresponding to each storing unit of data bit information stored in the data bit memory cell section 1. Data bit information DBDr of one unit read out from the data bit memory cell section 1 is supplied to a data selection circuit 5. In addition, the read-out data bit information DBDr of one unit and the corresponding check bit information CBDr read out from the check bit memory cell section 2 are supplied to an error detection and correction circuit 3, which detects whether or not an error exists in the one unit of read-out data bit information DBDr. If an error exists, the error detection and correction circuit 3 generates an error detection signal F, and if the detected error can be corrected, the error detection and correction circuit 3 also generates corrected data bit information CRD to a data selection circuit 5, and in the case of no error, the error detection and correction circuit 3 outputs the received read-out data bit information DBDr without modification to the data selection circuit 5.

The electrically writable non-volatile semiconductor memory 10 also includes an output selection memory cell section 4 composed of at least one electrically writable non-volatile semiconductor memory cell so that a selection signal S of a level corresponding to a content stored in non-volatile semiconductor memory cell 4 is outputted to a selection signal switching circuit 7.

The shown semiconductor integrated circuit also comprises an output selection register 6 configured to be set in accordance with a register setting signal RS and to output another selection signal R of a level corresponding to a content registered in the output selection register 6. The two selection signals S and R are supplied to the selection signal switching circuit 7 controlled by a level of a test signal TS, and one of the two selection signals S and R selected by the selection signal switching circuit 7 is outputted as a data selection signal DS to the data selection circuit 5. In accordance with the data selection signal DS, the data selection circuit 5 selects one of the read-out data bit information DBDr and the information CRD/DBDr of the error detection and correction circuit 3, and outputs the selected one as output data OD.

Furthermore, the data bit memory cell section 1 includes a test data region 8 composed of at least a first test data bit area 8A storing first correct data bit information of one unit, and a second test data bit area 8B storing one unit of error data bit information formed by replacing a predetermined bit or bits of second correct data bit information by an error bit or bits. In addition, the check bit memory cell section 2 includes a test check bit region 9 composed of at least a first test check bit area 9A storing a check bit information corresponding to the first correct data bit information stored in the first test data bit area 8A, and a second test check bit area 9B storing a check bit information corresponding to the second correct data bit information on the basis of which the error data bit information stored in the second test data bit area 8B was produced.

Before the semiconductor integrated circuit is assembled in a package or a system both of which do not allow to erase the content of the memory, a test will be conducted similarly to a conventional case, by setting the test signal TS so as to cause the selection signal switching circuit 7 to output the selection signal S of the output selection memory cell section 4 to the data selection circuit 5 as the data selection signal DS.

The data bit information DBD is stored by each predetermined unit in the data bit memory cell section 1, and is read out by each predetermined unit as the read-out data bit information DBDr. The check bit information CBD generated to correspond to each predetermined unit of the data bit information DBD stored in the data bit memory cell section 1 is stored in the check bit memory cell section 2, and the check bit information CBDr corresponding to the read-out data bit information DBDr is read out from the check bit memory cell section 2, in synchronism with the reading-out operation of the data bit information DBDr stored in the data bit memory cell section 1

The read-out data bit information DBDr and the read-out check bit information CBDr are supplied to the error detection and correction circuit 3. The error detection and correction circuit 3 brings the error detection signal F to "1" (or "0") if there is an error in the read-out data bit information DBDr, and to "0" (or "1") if there is an error in the read-out data bit information DBDr. In addition, if there is an error in the read-out data bit information DBDr and if the detected error can be corrected, the error detection and correction circuit 3 corrects the read-out data bit information DBDr and generates corrected data bit information CRD to the data selection circuit 5. If there is no error in the read-out data bit information DBDr, the error detection and correction circuit 3 outputs the read-out data bit information DBDr without modification to the data selection circuit 5.

Since the selection signal switching circuit 7 is controlled by the test signal TS to output the selection signal S of the output selection memory cell section 4 to the data selection circuit 5 as the data selection signal DS, the data selection circuit 5 selects, in accordance with a level of the selection signal S, either the read-out data bit information DBDr outputted from the data bit memory cell section 1 or the data bit information CRD/DBDr outputted from the error detection and correction circuit 3. Since the selection signal S must have been fixed from the moment the system is reset, the selection signal S is previously stored in the output selection memory cell section 4 composed of the electrically writable non-volatile semiconductor memory cell.

Next, explanation will be made on the testing of the disclosed semiconductor integrated circuit before it is assembled in a package or a system both of which do not allow to erase the content of the memory.

In order to verify or test whether or not the data bit information was been correctly written into the data bit memory cell section 1 and whether or not the written data bit information can be correctly read out from the data bit memory cell section 1, the following operation will be executed: The data bit information DBD and the corresponding check bit information CBD are written, and the output selection memory cell section 4 is set to cause the data selection circuit 5 to select the data bit information DBDr read out from the data bit memory cell section 1. For example, this condition of the output selection memory cell section 4 corresponds to a condition in which the output selection memory cell section 4 has not yet been written by any signal. Thereafter, the data bit information DBDr read out from the data bit memory cell section 1 is outputted to an external circuit, and compared with the original data bit information DBD which had been written into the data bit memory cell section 1.

In order to verify and test the operation of the error detection and correction circuit 3, the following operation is performed: The output selection memory cell section 4 is set to cause the data selection circuit 5 to select the information CRD/DBDr outputted from the error detection and correction circuit 5. For example, this condition of the output selection memory cell section 4 corresponds to a condition in which the output selection memory cell section 4 has been written by a selection signal SS. In addition, the correct data bit information DBD and the corresponding check bit information CBD are written into the data bit memory cell section 1 and the check bit memory cell section 2, respectively. Thereafter, the data bit memory cell section 1 and the check bit memory cell section 2 are read out, and the output data OD of the data selection circuit 5 is compared with the original correct data bit information DBD which had been written into the data bit memory cell section 1. In addition, error data bit information formed by replacing a predetermined bit or bits of correct data bit information by an error bit or bit, is written into the data bit memory cell section 1. Thereafter, the data bit memory cell section 1 and the check bit memory cell section 2 are read out, and the output data OD of the data selection circuit 5 is compared with the correct data bit information corresponding to the error data bit information.

After the semiconductor integrated circuit is assembled in a package or a system both of which do not allow to erase the content of the memory, it is no longer possible to write the output selection memory cell section 4. Therefore, a test will be conducted by setting the test signal TS so as to cause the selection signal switching circuit 7 to output the selection signal R of the output selection register 6 to the data selection circuit 5 as the data selection signal DS, and by storing into the output selection register 6 a value corresponding to the level of the data selection signal DS to be applied to the data selection circuit 5.

Since the output selection register 6 is rewritable, it is possible to voluntarily set the data selection signal DS. In other words, it is possible to voluntarily select and supply either the output information CRD/DBDr of the error detection and correction circuit 4 or the readout data bit information DBDr outputted from the data bit information memory cell section 1, as the output data OD of the data selection circuit 5.

As mentioned hereinbefore, the first test data bit area 8A and the second test data bit area 8B of the test data region 8 in the data bit memory cell section 1 respectively store the first correct data bit information of one unit and one unit of error data bit information formed by replacing a predetermined bit or bits of the second correct data bit information by an error bit or bits. In addition, the first and second test check bit areas 9A and 9B of the test check bit region 9 in the check bit memory cell section 2 respectively store a check bit information corresponding to the first correct data bit information and a check bit information corresponding to the second correct data bit information. Therefore, in case of reading the correct information, the output selection register 6 is set by the register setting signal RS to cause the data selection circuit 5 to select the data bit information DBDr read out from the data bit memory cell section 1, and the first test data bit area 8A of the test data region 8 in the data bit memory cell section 1 is read out, so that the information outputted from the data selection circuit 5 is compared with the first correct data bit information which had previously been written in the first test data bit area 8A of the test data region. In case of reading the error information, the output selection register 6 is set by the register setting signal RS to cause the data selection circuit 5 to select the output information CRD/DBDr of the error detection and correction circuit 3, and the first and second test data bit areas 8A and 8B of the test data region 8 in the data bit memory cell section 1 and the corresponding first and second test check bit areas 9A and 9B of the test check bit region 9 are read out. The information outputted from the data selection circuit 5 is compared with the first and second correct data bit information, for the purpose of verifying the operation of the error detection and correction circuit 3.

As seen from the above description of the embodiment with reference to the drawings, the present invention is characterized in that there is provided the output selection register set with the register setting signal so as to output the selection signal having the level of the stored content of the output selection register itself, and in that there is also provided the selection signal switching circuit receiving the selection signal from the output selection register and the selection signal from the output selection memory cell section and for selecting one of two selection signals in accordance with the test signal. With this arrangement, even after the semiconductor integrated circuit is assembled in a package or a system both of which do not allow to erase the content of the memory, if the selection signal switching circuit is controlled by the test signal so as to cause the selection signal of the output selection register to be supplied to the data selection circuit, it is possible to test or verify the data read out from the data bit memory cell section and the information outputted from the error detection and correction circuit, since the value of the output selection register can be voluntarily set. Namely, it is possible to verify the operation of the error detection and correction circuit.

The invention has thus been shown and described with reference to the specific embodiment. However, it should be noted that the present invention is in no way limited to the details of the illustrated structures but changes and modifications may be made within the scope of the appended claims.

I claim:

1. A semiconductor integrated circuit comprising:
   a data bit memory cell section (1) composed of a number of electrically writable non-volatile semiconductor memory cells and for storing data bit information (DBD) in units of a predetermined number of bits;

a check bit memory cell section (2) composed of a number of electrically writable non-volatile semiconductor memory cells and for storing check bit information (CBD) corresponding to each storing unit of data bit information stored in said data bit memory cell section (1);

an error detection and correction circuit (3) receiving data bit information (DBDr) read out from said data bit memory cell section (1) and the corresponding check bit information (CBDr) read out from said check bit memory cell section (2), said error detection and correction circuit (3) detecting whether or not an error exists in said read-out data bit information (DBDr), and generating corrected data bit information (CRD) if an error exists and the detected error can be corrected, said error detection and correction circuit (3) outputting the received read-out data bit information (DBDr) without modification in the case of no error;

an output selection memory cell section (4) composed of at least one electrically writable non-volatile semiconductor memory cell and for outputting a first selection signal (S) of a level corresponding to a content stored in said output selection memory cell section (4) itself;

an output selection register (6), set in accordance with a register setting signal (RS), for outputting a second selection signal (R) of a level corresponding to a content registered in said output selection register (6) itself;

a selection signal switching circuit (7) receiving said first and second signals (S) and (R) and controlled by a test signal (TS), so as to output a data selection signal (DS) formed of one of said first and second signals (S) and (R) designated by said test signal (TS); and a data selection circuit (5), receiving said data bit information (DBDr) read out from said data bit memory cell section (1) and said output (CRD/DBDr) of said error detection and correction circuit (3), and controlled by said data selection signal (DS) so as to output, as output data (OD), one of said data bit information (DBDr) read out from said data bit memory cell section (1) and said output (CRD/DBDr) of said error detection and correction circuit (3), designated by said data selection signal (DS).

2. A semiconductor integrated circuit claimed in claim 1 wherein said data bit memory cell section (1) includes a test data region (8) composed of at least a first test data bit area (8A) storing first correct data bit information of one unit, and a second test data bit area (8B) storing one unit of error data bit information formed by replacing a predetermined bit or bits of second correct data bit information by an error bit or bits, and wherein said check bit memory cell section (2) includes a test check bit region (9) composed of at least a first test check bit area (9A) storing a check bit information corresponding to said first correct data bit information stored in said first test data bit area (8A), and a second test check bit area (9B) storing a check bit information corresponding to said second correct data bit information on the basis of which said error data bit information stored in said second test data bit area (8B) was produced.

* * * * *